July 9, 1940.    R. L. LUNT    2,206,908
METHOD FOR ELECTROPLATING MOLDS FOR RUBBER ARTICLES
Filed Nov. 5, 1938    2 Sheets-Sheet 2
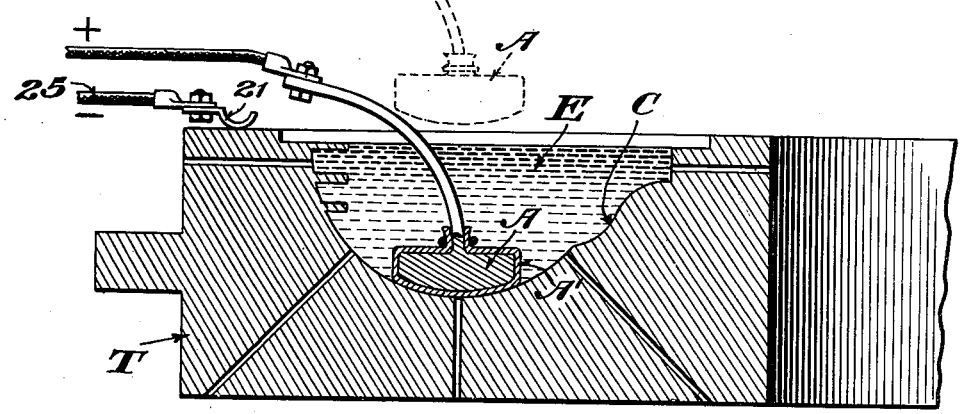
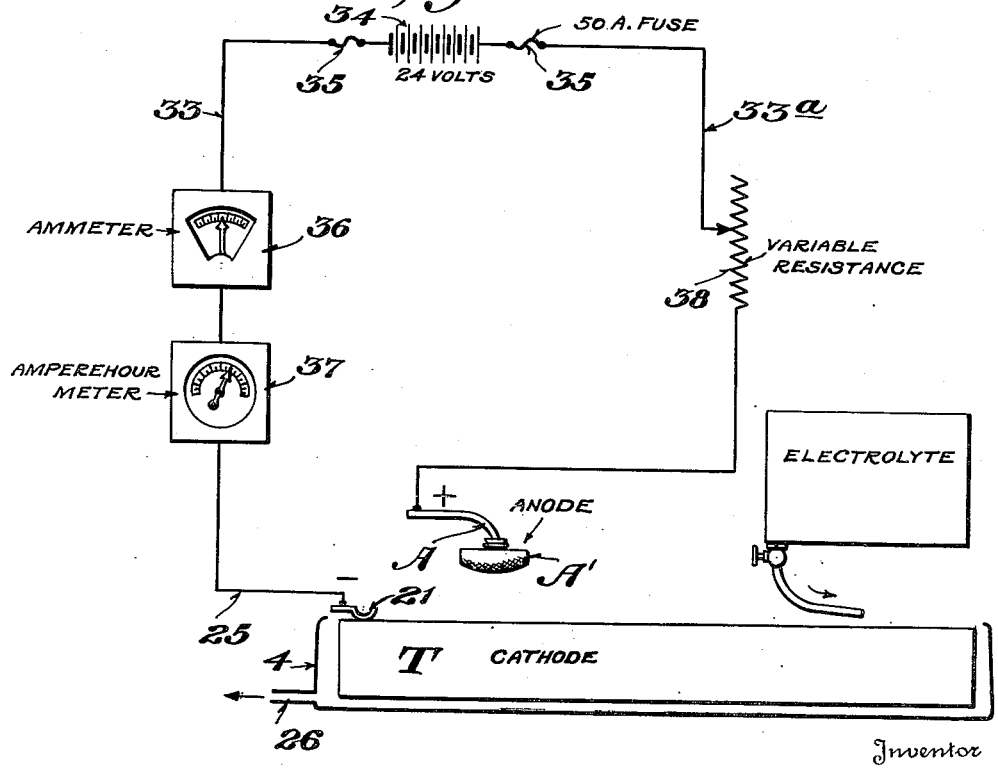
Inventor
Raymond L. Lunt,
By Wilkinson & Groff
Attorneys Patented July 9, 1940

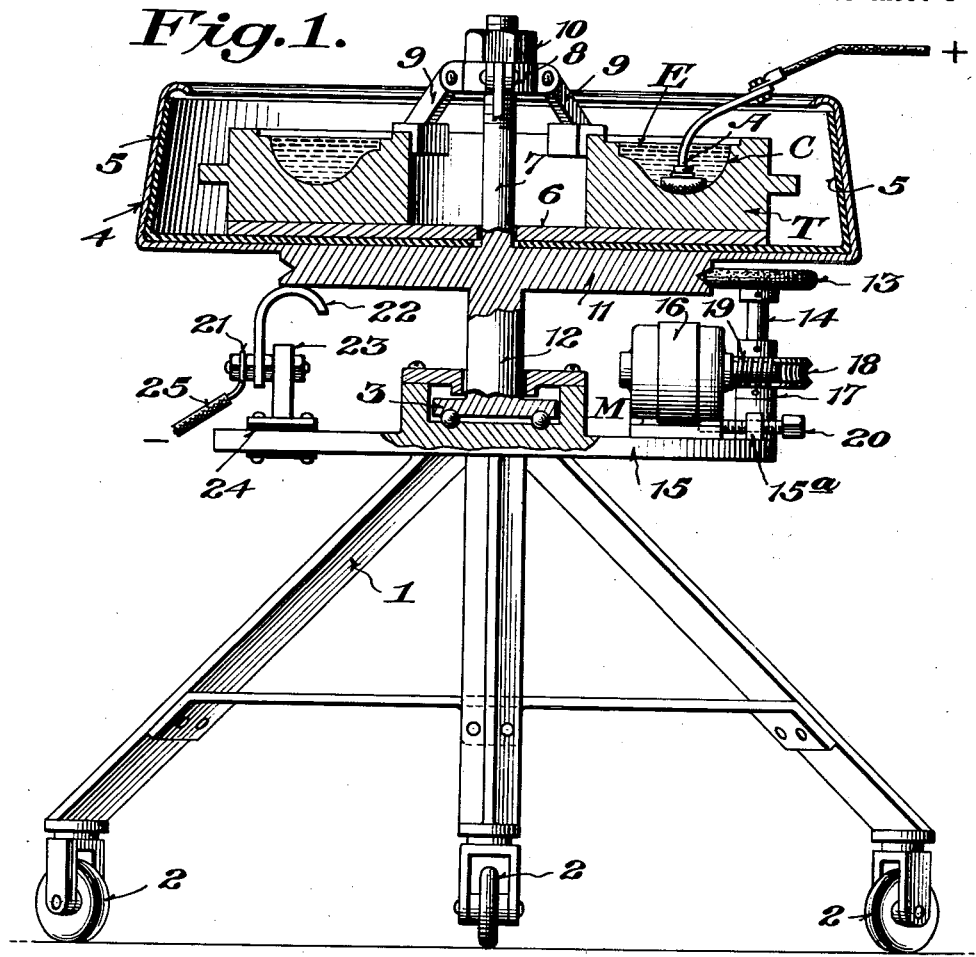

2,206,908

UNITED STATES PATENT OFFICE 2,206,908

METHOD FOR ELECTROPLATING MOLDS FOR RUBBER ARTICLES

Raymond L. Lunt, Cuyahoga Falls, Ohio

Application November 5, 1938, Serial No. 239,094

1 Claim. (Cl. 204—1)

This invention relates to a novel method for electroplating the inner surface of molds for rubber articles, such, for example, as tire molds, in a practical and expeditious manner.

Tire molds of the type used by the automotive tire manufacturing industry are in the majority of cases provided with intaglio and relief mold surfaces for giving the desired form, shape, or design to the tread and side walls of the tire. Ordinarily, these molds are made of iron and consist of two sections or halves which may be suitably held together in forming the tire. In use, the mold surfaces gradually become sulphided, due to the action of the sulphur in the rubber sulfiding the iron, thus causing the mold to become brittle and to crack and forming imperfect tire surfaces.

The present methods of cleaning tire molds are costly and inefficient. In the smaller plants tire molds are cleaned by burning off with an oxy-acetylene flame. In the larger plants tire molds are cleaned by sand blast under high pressure where the sand used is a powdered soap stone or talc instead of silica sand. In most factories it is standard practice upon receipt of a new mold, or a repaired mold from the machine shop, to immediately burn it off with an oxy-acetylene torch.

After a mold has been plated by the present process it is not necessary to burn it off; neither is it necessary to sand blast it, but it can be cleaned in a comparatively few minutes of time by the use of a wire scratch brush driven by a motor and flexible shaft. This greatly reduces the cleaning time, the cleaning cost, and the effectiveness of the cleaning of a mold.

Also, in molds plated by the present process it is not necessary to use tire dope or mold dope, with the result that the mold will last a much longer time, without cleaning, than it can possibly in a mold which is unplated. This ratio of increased time before cleaning is about 300%.

Another item of importance to tire and rubber manufacturers is the fact that by plating tire molds and their register rings they save a great deal on mold upkeep per year. In a pit mold, the life of a register ring is usually about two months. This means that it is necessary to replace the register rings for each mold six times per year at a total annual cost of generally $180.00 per mold.

The advantages of plating the inside surfaces of rubber molds are not only those of saving expense, from less frequent cleaning and from upkeep of molds, but the surfaces of the rubber articles produced have a much smoother denser surface than those which are made in molds of ordinary uncoated steel or cast iron. This gives a much better appearance to the rubber article, such as to the side walls and tread of a tire, or to any other article where appearance is of moment. It also does away with the necessity for various finishing operations on the rubber article which would otherwise become necessary. Furthermore, the molded rubber tire draws or slips more easily and readily from the plated mold than it would from an unplated mold.

The rubber companies for years have known that tin is a metal to which rubber does not adhere, but no electroplater and no rubber company have as far as known heretofore been able to plate the inside of a tire mold successfully with any metal. And, even if it were atempted to plate the inside of a tire mold with chromium, it would be necessary to form an anode of lead which would exactly follow all of the indentations of the side wall, lettering, and tread which would require a number of days at considerable expense, so that the method would be not practical from any standpoint. A tire mold plated by chromium in the usual immersion tank process would cost the tire companies about $250.00 per tire mold, and would probably require thirty days for each completion.

Tire tube molds which have no indentations and which are perfectly smooth on their inside surfaces have been plated with chromium for a number of years by means of making or casting inside core-like anodes of lead which exactly follow the contour of the inside tire mold and then by means of the usual tank immersion process to put on a plating of chromium.

As far as known, molds for tires which always have irregular indentations on the tread have never before been plated by any process whatsoever on the inside. Whereas, by means of the present process one can plate on the mold-cavity wall any metal or combination of metals which could ordinarily be plated, and some metals and alloys which are not commonly plated by electrolysis at the present writing.

Accordingly, the present invention has primarily in view a process and apparatus for electroplating only the mold cavity of rubber molds thoroughly and efficiently, regardless of the contour of their surfaces, with a minimum quantity of electrolytic fluid and a minimum consumption of electrical energy while, at the same time, forming a plate or coating of tin or chromium or of any preferred metal or alloy to which rubber will not adhere which plating tenaciously adheres to the inner face of the mold and also provides a surface which is smooth and regular. That is to say, the process according to the present invention contemplates the use of a movable or dirigible anode which may be manipulated to any position by hand, and, thereby moved relative to the work, or, alternatively, the mold itself may be moved while the anode is held in proper relation to the surface to be plated. In that connection it is proposed to use the mold itself as a means for holding the electrolyte which is placed in the mold cavity while the anode is manipulated over the surface to be treated, thereby effectively plating the desired surfaces evenly. Thus, it is unnecessary to subject the mold to numerous finishing operations after the same is subjected to treatment by the present method and apparatus, only a simple polishing or burnishing operation being employed if desired or required.

Another object of the invention is to provide a movable anode comprising a soluble electrode covered or encased by a wool sponge or equivalent envelope and which may be manipulated by the operator against the surface to be plated to complete the electrolytic action necessary for depositing metal on the mold surfaces.

A further object of the invention is to provide a novel mobile apparatus to receive the tire mold. This apparatus permits the work of plating the molds to be carried out expeditiously in a plant or factory under favorable operating conditions and with a minimum of investment in equipment, materials, and space.

With the above and other objects in view which will more readily appear as the nature of the invention is better understood, the same consists in the novel construction, combination and arrangement of parts hereinafter more fully described, illustrated and claimed.

By way of illustrating the process and a preferred form of apparatus, reference may be had to the accompanying drawings, in which:

Figure 1 is a vertical sectional view of a mobile plating unit having a tire mold section therein ready for the plating operation, the tub and the mold rotating together.

Figure 2 is a detail sectional view of a modified form of apparatus wherein the electrolyte tub or receptacle is held stationary while the mold only is rotated.

Figure 3 is an enlarged detail vertical cross-sectional view of a portion of a tire mold illustrating the manner of manipulating the movable anode in the electrolyte trapped in the mold cavity.

Figure 4 is a diagrammatic view of the circuit arrangement.

Similar reference characters designate corresponding parts throughout the several figures of the drawings.

In carrying out the invention it is proposed to use any suitable acid electrolyte, and a soluble anode. In that connection it may be observed by reference to Figure 1 that the tire mold section designated generally as T, and having a mold cavity C, may receive a suitable quantity of electrolyte E in which the anode A operates to produce the desired plate or coating on the inner surface of the mold. It, of course, is understood that the section of the tire mold T is included in the negative side of the electric circuit.

In practice, it is intended to mount or support the tire mold T in such a way that it may be moved or rotated while the operator holds the anode A and manipulates the same according to the demands of the particular plating operation.

Referring to Figure 1 it may be observed that the form of apparatus illustrated therein includes a suitable stand or frame designated generally as 1 mounted on swivel casters 2 and having a suitable bearing 3 for supporting a fluid receiving tub or receptacle 4. Said tub may be of metal provided with an interior insulating lining 5 of rubber or the like, and since the tub is rotatably supported, it is necessary to remove the spent electrolyte by means of a suction pipe line or the like, and thence conduct it to a rejuvenating source tank.

The central portion of the tub is provided with a wood or equivalent insulating insert or block 6 on which the tire mold section may rest, and, for the purpose of holding the section centered within the tub, the latter may be provided with an upstanding post 7 having the collar portion 8 of a suitable clamp mounted thereon. This clamp is provided with a plurality of pivotally connected arms 9 formed at their lower ends to engage the inner circumference of the tire mold and all of the arms may be locked or held in place by a suitable nut 10 carried by the upper threaded end of the post 7.

While any suitable means may be employed for rotating the tub 4, a preferred manner of accomplishing this end is shown in Figure 1 from which it will be seen that the bottom of the tub may be provided with a pulley or wheel 11 having the shaft 12 which rests in the bearing 3 previously referred to, while the periphery of the pulley or wheel is intended to be engaged by a drive wheel 13.

This drive wheel may be of the friction type and is preferably mounted on a shaft 14 which is part of an adjustable motor assembly designated generally as M mounted on the platform or support 15 of the stand. The motor assembly M includes an electric motor 16 mounted on a base slidable in suitable guides, and is therefore slidable radially of the shaft 12 of said platform or support. The base which supports the motor also carries a vertical bearing 17 for the shaft 14, and the said shaft is provided within the bearing with a worm gear 18 meshing directly with a worm pinion 19 on the shaft of the motor 16.

It will, thus, be apparent that the wheel 13 is driven directly by the motor 16, and that the motor and the shaft 14 carrying the wheel 13 are mounted on a common support or base so that the wheel 13 and shaft 14 may be removed toward and from the pulley 11 on the base of the tub. For the purpose of maintaining proper engagement between the wheel 13 and the pulley 11, the platform or support 15 may be provided with a lug 15$^a$ having internal threads for receiving an adjusting screw 20. The forward end of this screw bears against a portion of the base which carries the motor 16 so that rotation of the screw 20 in one direction will move the entire motor assembly including the wheel 13 toward the axis of the machine.

The dirigible anode A, which, of course, forms the positive electrode of the electrolytic circuit, is preferably in the form of a soluble metal such, for example, as tin, and is encased in a wool sponge or other equivalent fabric covering A'. This anode completes the electrolytic current through the electrolyte E to a negative terminal designated generally as 21 and supported by the platform 15 or otherwise. The terminal 21 preferably includes a resilient metallic brush 22 mounted on a support 23 insulated at 24 from the platform 15 and having a lead 25 connecting with the source of electric energy. Since the pulley or wheel 11 is metal, and the post 7 as well as the clamp 8—9, are in metallic conducting relation to the wheel 11, it will be apparent that the circuit from the anode A will be completed through the electrolyte E to the tire mold T which forms the cathode of the electrolytic circuit.

According to the modification shown in Figure 2 it is proposed to provide a stationary tub 4ª mounted on a suitable stand 1ª, which like the stand 1 may be mounted on casters or wheels. This tub may be provided with a draw-off faucet or the like 26 and may also be lined with rubber or other insulating material which will not be attacked by the etching acid or electrolyte. The central portion of the tub 4ª is provided with a central tubular wall 4ᵇ for receiving a post 27 rotatably mounted on a bearing 28 and driven through the medium of the gear 29 and the motor 30. The upper end of the post 27 may be provided with a spider-like cradle or support 31 having the radial arms 32 for supporting the section T of a tire mold. A suitable negative terminal 21ª may be provided at one edge of the tub for engaging the metallic body of the tire mold section T when it is placed in the tub. According to this form of apparatus the tub remains stationary relative to the rotating work or mold T and has the advantage of more readily connecting the tub in the electrolyte circuit by fixed or permanent tubes or pipes.

It would, of course, be understood in connection with both forms of the apparatus that the previously prepared electrolyte solution may be stored in conventional tanks or containers and conveyed by suitable flexible tubing to the cavity of the tire mold. So much of the electrolyte as spills over from the mold cavity into the tub may be conducted back to a collecting tank and rejuvenated or restored to its proper electrochemical content.

Figure 3 diagrammatically illustrates the manner of carrying out the process. From this figure it will be observed that the electrolyte is trapped in the mold cavity C in sufficient quantity to completely fill the same while the anode A is being manipulated over the mold surfaces. As the entire mold T is rotated past the operator's station all of the surfaces of the mold may be manually brought into contact with the anode and the electric current deposits the desired plate on the inner surface of the mold. While it will, of course, be understood that any desired acid electrolyte containing the desired metallic salts may be used, the present process preferably involves the use of an acid solution of stannous chloride.

Figure 4 of the drawings illustrates the circuit arrangement which may be employed. As will be seen from this figure the circuit, designated generally as 33—33ª, includes a storage battery 34 provided adjacent each terminal with suitable fuses 35. One leg of the circuit, namely 33, includes an ammeter 36 and an ampere-hour meter 37 which connects by the lead 25 to the cathode terminal 21. It will, of course, be understood that the tire mold T is in effect the cathode of the circuit. The positive leg of the circuit, namely 33ª, includes a variable resistance 38 and the anode A which may be manipulated by the operator as desired.

In practice, it will be understood, that the electrolyte E is placed in the mold cavity C and the plating operation effected by manipulating the anode A; and, after the plating has been completed the electrolyte E may be syphoned off for re-use. Since a soluble anode is used the strength of the electrolyte E is adequately maintained.

The receptacles or tubs 4 and 4ª, respectively shown in Figures 1 and 2 are of special utility in the general process or method involved in plating tire molds. That is to say, the receptacles or tubs are intended to hold the washing and neutralizing solutions employed as a part of the plating process, which solutions however are used before and after the plating operation. For example, the mold to be plated is preliminarily cleaned by any suitable mechanical means and thereafter it may be placed in one of the receptacles or tubs shown. While in the tub, the mold is subjected to an etching bath of an acid pickling solution, which roughens or pits the surface of the mold to render it susceptible of better receiving the plating coat. After the etching has been accomplished the etching solution is drawn off and then the mold is washed with hot water. The hot water is then drained away and the electrolyte is placed in the mold cavity and the plating operation proceeded with. The electrolyte is then removed from the mold cavity by a suction tube and the plated mold is then washed out with hot water. The hot water is then drawn off and the mold is then subjected to a neutralizing bath consisting of a solution of washing soda in the proportion of approximately two pounds to the gallon of water. In fact the mold is permitted to stand in this solution from one to two hours. The neutralizing solution is then drained off and the mold flushed with hot water and the latter is removed from the tub and the mold is then ready to be removed from the tub. After being dried, preferably by a hot air blast, the mold is buffed with a suitable buffing wheel and the operation is finished.

From the foregoing it will be apparent that the present method greatly facilitates the tin or chromium plating or coating of the cavities of tire molds inasmuch as the mold sections may be readily supported for movement to bring all of the mold surfaces before an operator's station where the movable anode A may be promiscuously but skillfully manipulated by the operator to properly deposit the metallic coating on the mold surface.

Because of the mobility of the forms of apparatus used as an incident to the process, the latter may be practiced with facility, as an accessory or adjunct to the maintenance of tire molds in a convenient and expeditious manner.

I claim:

A process of electroplating the cavities of molds for rubber articles which consists in connecting the mold as the cathode of the electroplating circuit and placing the electrolyte in the mold cavity, rotating the mold in a horizontal plane, and then applying to the cathode surface during rotation thereof a movable anode having a non-conducting porous covering and being materially smaller in size than the cathode cavity.

RAYMOND L. LUNT.